Jan. 29, 1963 D. A. HORSTKORTA 3,076,060

MAGNETIC TAPE APPARATUS

Filed April 1, 1960 4 Sheets-Sheet 1

DONALD A. HORSTKORTA
INVENTOR.

BY Nathan N. Kallman

ATTORNEY

DONALD A. HORSTKORTA
INVENTOR
BY Nathan N. Kallman
ATTORNEY

DONALD A. HORSTKORTA
INVENTOR.
BY Nathan N. Kallman
ATTORNEY

DONALD A. HORSTKORTA
INVENTOR.
BY Nathan N. Kallman
ATTORNEY

United States Patent Office 3,076,060

Patented Jan. 29, 1963

3,076,060
MAGNETIC TAPE APPARATUS

Donald A. Horstkorta, Menlo Park, Calif., assignor to Ampex Corporation, Redwood City, Calif., a corporation of California Filed Apr. 1, 1960, Ser. No. 19,278
14 Claims. (Cl. 179—100.2)

This invention relates to an improved magnetic tape apparatus, and in particular to an adjustable and replaceable magnetic head carrier assembly for use with magnetic tape apparatus.

The control of head-to-tape contact in a magnetic tape apparatus is extremely important, especially for recording and reproducing high frequency signals such as video signals. Poor or erratic contact caused by worn or uneven head surface may result in loss, dropout, or distortion of signals to be recorded or reproduced. On the other hand, proper contact between the head tip and the tape provides for faithful recording and reproduction of signal information, in addition to providing for improved head wear characteristics.

In presently known magnetic tape apparatus, the installation of a new head or the replacement of a worn head generally requires many adjustments before proper head-to-tape contact is established, making replacement tedious and time consuming. Furthermore, in apparatus which employs a rotating type magnetic head assembly, the transducer head of the head assembly usually continues in intimate contact with the magnetic tape even after the apparatus is switched to its "Standby" mode. In such mode, the intimate contact between transducer and tape causes unnecessary wear necessitating more frequent replacement.

It is therefore an object of this invention to provide an improved magnetic tape apparatus.

It is another object of this invention to provide a magnetic transducer carrier assembly which may be utilized in a magnetic tape apparatus to give optimum head-to-tape contact.

It is a further object of this invention to provide a magnetic transducer carrier assembly making simple and economical replacement possible.

It is a still further object of this invention to provide a magnetic tape apparatus wherein the magnetic transducer assembly is automatically retracted from the tape during the standby mode.

According to this invention, a magnetic recording and reproducing apparatus is provided with an adjustable and replaceable carrier means which supports a magnetic transducer that is rotated for scanning a magnetic medium. The carrier has a cooperating transport means for engaging a control member that is utilized for actuating the carrier in one direction along the carrier axis, and for limiting the motion of the carrier in the opposite direction.

In an embodiment of the invention, the carrier, which may be an elongated arm, is set in a recessed portion of a rotatable disc or scanning drum whereby the tip of a magnetic transducer or head projects from the arm and the drum. An apertured part of the carrier having a roller mounted therein cooperates with an adjustable tapered control rod, to retract the carrier arm with respect to the magnetic medium or tape, or to control the advance of the arm and the projecting transducer towards the tape. The control rod may have a fine vernier adjustment means to allow minute variations in such advance or retraction of the arm.

The invention will be described in greater detail with reference to the drawings in which.

Figure 1:
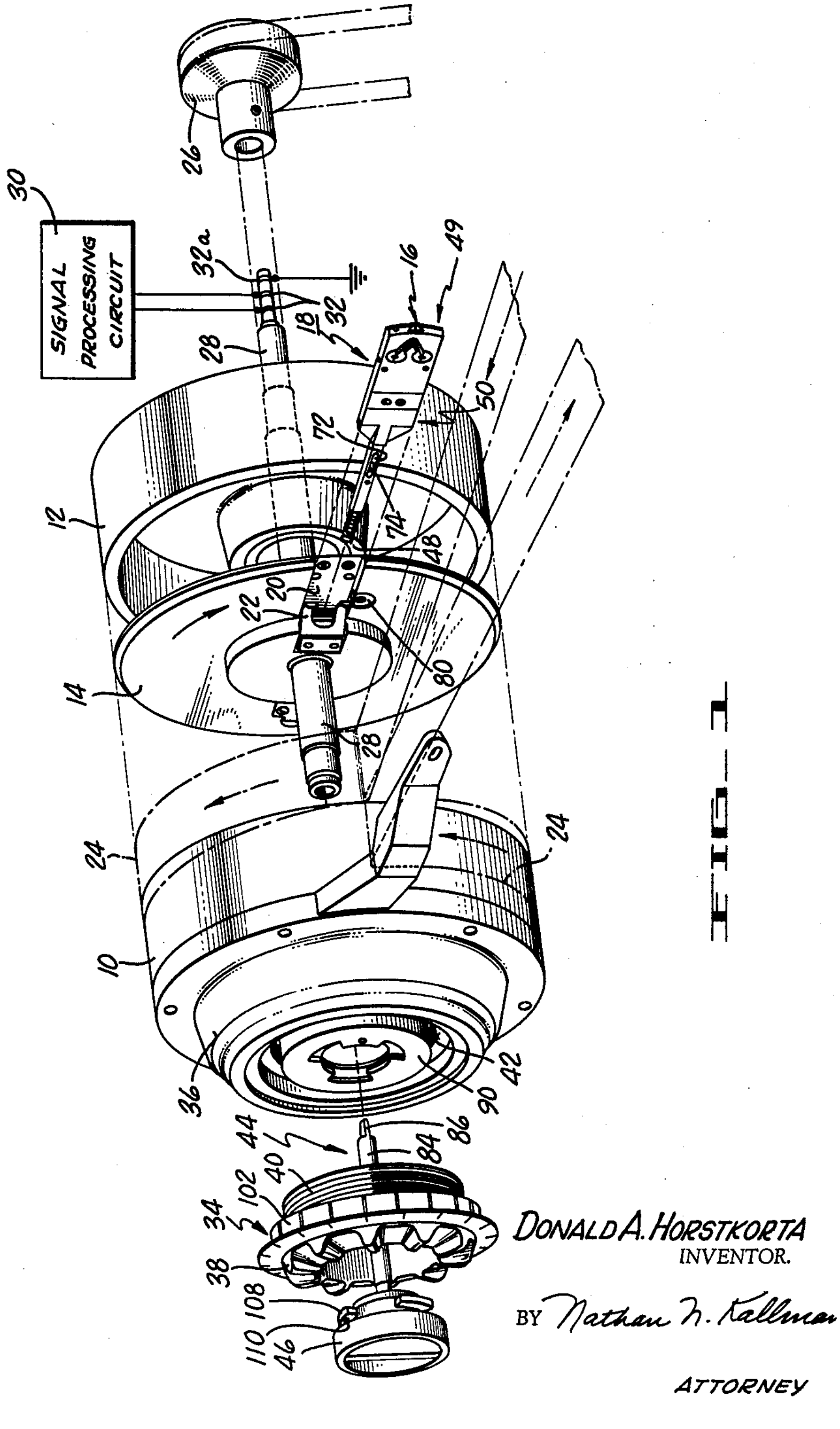
FIGURE 1 is a partally exploded view, in perspective, of a magnetic tape apparatus, in accordance with the invention.

In FIGURE 1, a first cylinder 10 is disposed adjacent to a second cylinder 12 having substantially the same diameter and coaxially mounted therewith. The cylinders 10 and 12 may be employed as fixed guides in a helical type scanning magnetic tape apparatus, for example. Between the two guides 10 and 12, there is a space in which a rotatable member or disc 14, hereinafter referred to as a scanning drum, is mounted in coaxial alignment with the guides. The scanning drum 14 carries a magnetic transducer 16, which is supported by a carrier arm 18 that is set in a recessed section 20 of the scanning drum 14. In operation, the carrier arm 18 is set into the recessed section 20 under a metallic spring clasp 22 fastened to the drum 14, which aids in positioning the arm 18 within the recess 20. When assembled, the transducer or head 16 projects from an end of the arm 18 and from the periphery of the drum 14, and contacts a movable magnetic medium or tape 24 as the scanning drum 14 is rotated.

For rotating the drum 14 in a plane normal to the axis of the guides 10 and 12, a drive mechanism 26 is coupled by means of a hollow drive shaft 28 to the drum 14. To supply the magnetic transducer 16 with radio frequency signal information during the "Record" mode, a signal current is derived from an electronic signal processing circuit 30 through slip rings 32 which are mounted on the shaft 28 that is coaxially aligned with the guides 10 and 12 and the scanning drum 14. Conversely during the "Reproduce" mode, signal information recorded on the tape 24 is transferred from the transducer 16 to the circuit 30. An additional slip ring 32*a* is supplied for connection to zero potential or ground.

A control means 34 for adjusting the position of the carrier arm 18 radially along the recessed section 20 of the drum 14 is set on a cover 36 that is fixed to the first cylinder or guide 10, through the hollow shaft 28, for engagement with the carrier arm 18. The drum shaft 28 has an inner diameter such that a close fit for slidable engagement with the cylindrical type control rod 44 is provided. The control means 34 includes an adjustment knob 38 having a threaded flange 40 which may be rotated in cooperation with a threaded portion 42 formed within the cover 36. The rotation of the adjustment knob 38 allows a control rod 44 to be moved axially towards or away from the carrier arm 18.

The control means 34 also includes a release cap 46 which is inserted within the adjustment knob 38 and the cover 36 by a snap and detent arrangement. When it is desired to remove the control rod 44 from the magnetic tape apparatus, the release cap 46 is depressed, rotated, and disengaged from the cover 36 so that the control rod 44 may be removed therewith. The removal of the release cap 46 and the control element 44 results in the ejection of the carrier arm 18 by the expansion of a preloaded spring 48 which is engaged with the carrier arm 18, and permits immediate replacement of a carrier arm with a new transducer.

Figure 2:
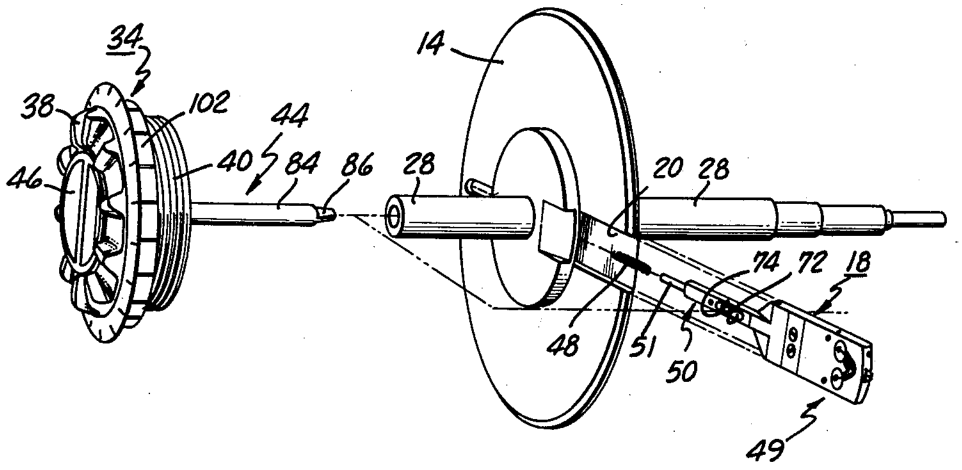
FIGURE 2 is a simplified exploded view of a portion of the same apparatus.

In the exploded view of FIGURE 2, the relationship between the scanning drum 14, the carrier arm 18, the shaft 28, and the control element 44 is shown for illustrative purposes.

Figure 3:
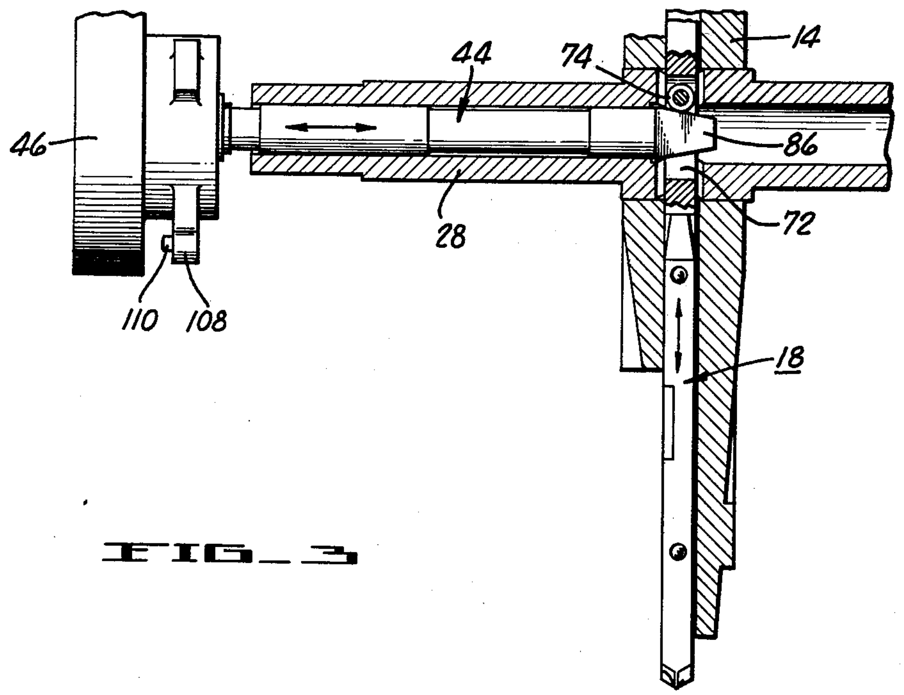
FIGURE 3 is an elevated view of a control means assembly, according to the invention.

FIGURE 3 represents an assembly, in perspective, of the elements shown in FIGURE 2, and indicates the manner of engagement of the drum 14, the arm 18, the shaft 28 and the control element 44 as occurs during the operation of the magnetic tape apparatus.

When the magnetic tape apparatus is in operation, the control element 44 rotates with the scanning drum 14 and the carrier arm 18. However, the release cap 46, adjustment knob 38, and guides 10 and 12 remain fixed. This is achieved by coupling the release cap 46 to the top of the control rod 44 through slip bearings.

Figures 4, 5:
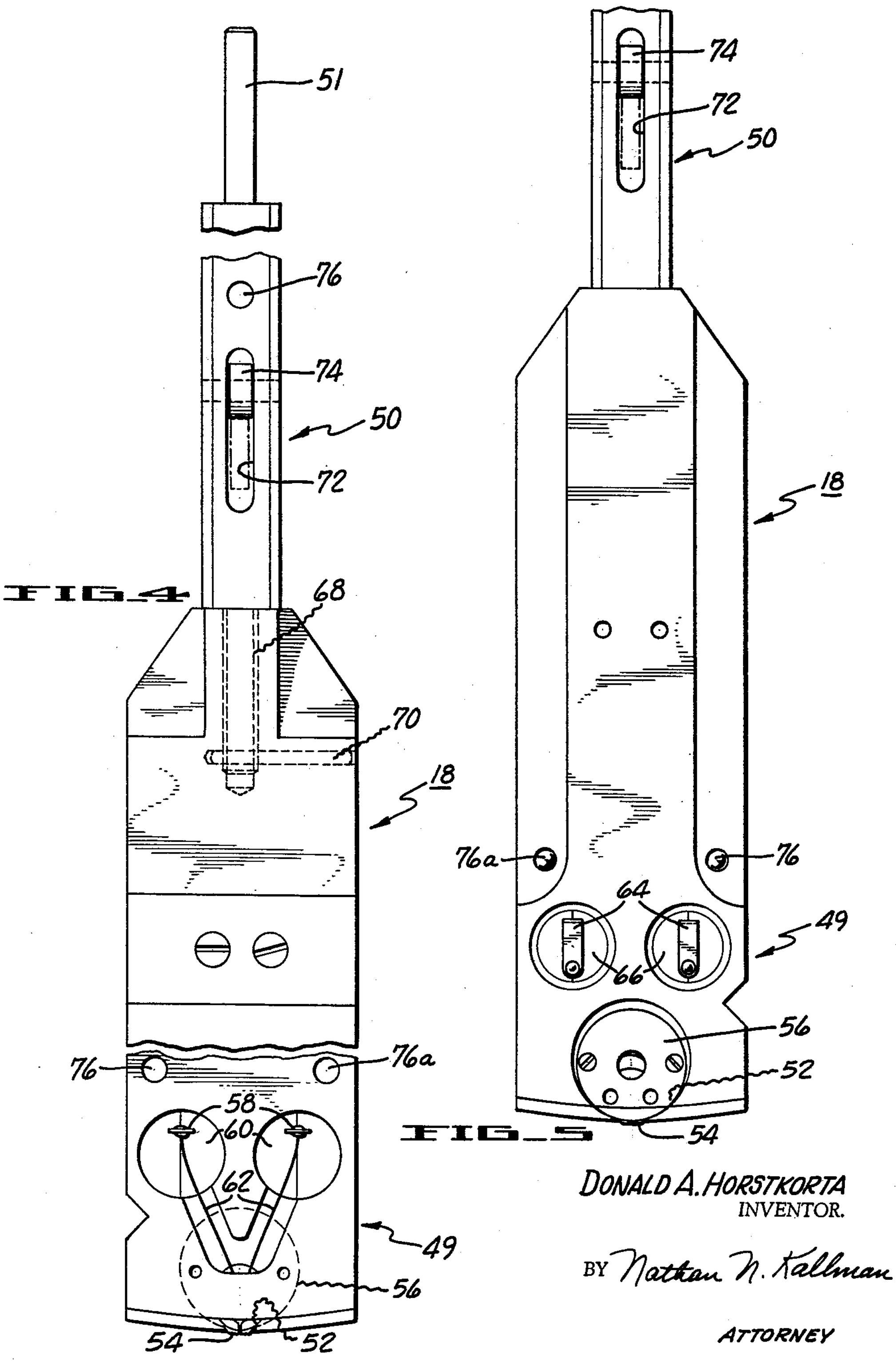
FIGURE 4 is a plan view of one side of a replaceable carrier arm of this invention.
FIGURE 5 is a plan view of the other side of the same carrier arm.

In FIGURES 4 and 5, the movable carrier arm 18 of the invention comprises a head-carrying part 49, a transport part 50 for sliding the carrier arm 18 radially, and a guide pin 51. The end of the head-carrying part or member 49 spaced from the transport part 50 is arcuate, and has a slot 52 for accommodating a magnetic head 54. The magnetic head 54 is retained within the slot 52 by a retaining ring 56 and the head 54 is set within the slot 52 so that its tip projects slightly from the end of the arm 18. When assembled with the rotatable drum 14, the arcuate end of the head-carrying member 49 is congruous with the peripheral configuration of the drum 14 so that only the head tip projects from the drum and the carrier.

At the top of the carrier arm 18, shown in FIGURE 2*a*, a pair of electrical terminals 58 is disposed within insulated cavities 60 adjacent to the head slot 52. Connected to the terminals 58 are wire leads 62 which pass a radio frequency signal to a coil carried by the head 54. At the bottom of the carrier arm 18, as shown in FIGURE 2*b*, a pair of wiping contacts 64, that correspond to and are connected with the terminals 58 are fixed within insulated recesses 66 for further connection to the signal processing circuit 30.

Leads are connected to the wiping contacts 64 and are directed along grooves at the bottom of the drum 14 into the hollow drive shaft 28. An insulating plastic member supports the wire leads within the shaft 28, for connection to the slip rings 32 attached at the end of the shaft. The wiring assembly may be arranged to provide a balance line to negate any erratic fields that may be intercepted during rotation of the scanning drum 14.

The transport part 50 of the carrier arm 18 is threaded to the head-carrying member 49 by means of a threaded shaft 68 which is secured by a roll pin 70 that is inserted within a bore in the threaded shaft 68 and is fixed in the head-carrying member 49. The transport part 50 includes an apertured portion 72 having an anchor roller 74 mounted therein to transport the carrier 18 axially. The diameter of the roller 74 is greater than the depth of the apertured portion 72 to allow frictional contact between the roller periphery and the drum surface along which the carrier arm 18 is moved. The size of the roller diameter is one of the factors which determines the extent of control of the movement of the carrier arm 18.

To complete the assembly of the carrier arm 18, the cylindrical guide pin 51 is attached to the transport part 50 for engagement with the compression spring 48 to provide preloading of the carrier arm 18. The guide pin 51 is necessarily of narrower cross section than the transport part 50 so that the compression spring 48 that surrounds the pin 51 may be compressed by the end of the transport part 50 when the carrier arm 18 is positioned in the recessed section 20 of the drum 14. The compressed spring 48 causes the arm 18 to be ejected from the recessed section 20 whenever the arm 18 is released from contact with the control rod 44 by means of the release cap 46.

To mount the carrier arm 18 in proper position in the recessed section 20 of the drum 14, the carrier arm 18 is provided with three point suspension by means of three spaced balls 76 which rest on hardened seats located on the deck of the recessed section 20, and which serve as reference points for setting the carrier 18 in the drum 14. Alternatively, one of the balls 76 that is offset from the longitudinal center of the arm 18 may be replaced by a tapered adjusting screw **76*a* which acts to tilt the arm 18** about its axis thereby providing a means for azimuth correction.

On the drum surface, adjacent to one wall of the recessed section 20, there is an alignment button 80 (shown in FIGURE 1) which is used to urge the carrier arm 18 laterally against the opposite recess wall and into correct alignment. The combination of the metallic spring clasp 22, the ball point suspension, the azimuth adjusting screw **76*a* and the alignment button 80 insures that the carrier arm 18 and the magnetic head 54 are correctly set in relation to the movable magnetic tape 24**.

Figure 6:
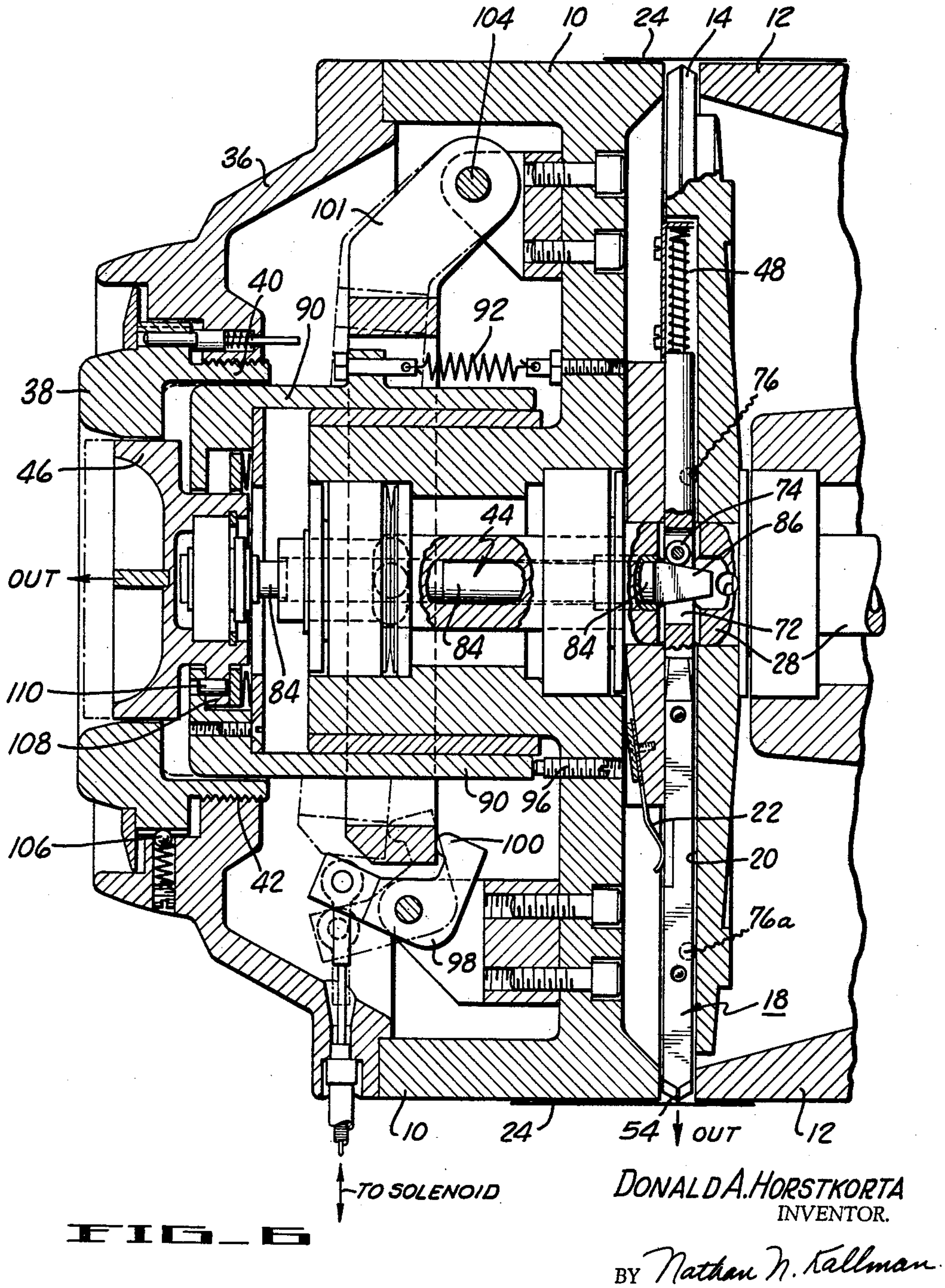
FIGURE 6 is a detailed sectional view of a control means in engagement with a carrier arm utilized with the apparatus of this invention.

As shown in FIGURE 6, the control rod 44 which is utilized to actuate the roller 74 and the carrier arm 18 has a cylindrical portion 84 with a longitudinal groove, a tapered segment 86 at one end, and the adjustment control knob 38 and release cap 46 at the other end. The hollow drum shaft 28 has a detent pin fixed on the inner wall which cooperates with the groove in the control rod 44 to align the rod within the shaft 28 so that the tapered end 86 fits properly within the aperture 72 of the transport part 50 of the carrier 18.

When the tapered segment 86 is engaged with the roller 74 in the apertured portion 72, the carrier arm 18 is prevented from sliding outwardly towards the tape 24 which would result from the action of the centrifugal force applied during rotation of the drum 14. As the tapered segment 86 is depressed into the aperture 72, the roller 74 is moved so that the head 54 is driven radially towards the center of the drum 14 and away from the magnetic tape 24. Therefore, as the control rod 44 is inserted further into the apertured portion 72, the head tip is urged further away from the magnetic tape 24. Conversely, if the control rod 44 is raised, the roller 74 is urged towards the drum periphery by virtue of the loading spring 48 and the centrifugal force of drum rotation thereby causing the head carrier 18 to slide closer to the tape 24. It is noted that the depth of penetration into the aperture 72 by the tapered segment 86 determines the relative position of the roller 74 on the drum surface during operation, thus determining the position of the carrier 18 and the head tip along the drum radius defined by the recessed section 20. It is also noted that the action of the centrifugal force due to rotation may be negated by proper balancing of the mass of the carrier arm 18 so that only the loading spring 48 acts to urge the carrier arm 18 outwardly from the drum 14.

To provide for the axial movement of the control rod 44, a supporting cup 90 is coupled to the control rod 44 and is also linked to four extension springs 92 that pull the cup 90 and the rod 44 down towards the drum 14 and carrier 18. Each extension spring 92 is attached between a pair of adjustable threaded eyebolts 94, one eyebolt of each pair being fastened to the supporting cup 90, while the other eyebolts are fastened to the fixed guide 10. Acting as stops to limit the supporting cup 90 in its downward path are set screws 96 fastened to the guide 10 and located in line with the cylindrical wall of the cup 90. These set screws 96 are adjusted during manufacture, in conjunction with the threaded eyebolts 94 which hold the extension springs 92, to provide a limit for the range of movement of the tapered segment 86 of the control rod 44 in one direction, namely towards the carrier arm 18.

To move the supporting cup 90 and the control rod 44 away from the carrier arm 18, a bell crank assembly 98 is provided adjacent to a yoke 100 that is connected to the cup 90. Spaced about 180° from the bell crank 98 at the other side of the cup 90, a hinged bracket 101 riding on a pivot pin 104 is attached to the yoke 100 and to the guide 10 and serves to restrict the motion of the cup 90 to its axial path.

The bell crank 98 may be actuated by a solenoid (not shown) which is energized during "Record or Reproduce" operation of the magnetic tape apparatus. When the bell crank 98 is so actuated, it pivots counterclockwise thereby thrusting an arm of the bell crank against the yoke 100. This action raises the supporting cup 90 and the control rod 44 which is coupled to the cup, and allows the tapered segment 86 of the rod 44 to be raised adjacent to the roller 74. Therefore, when the scanning drum 14 is rotated during "Record or Reproduce," the centrifugal force and/or the loading spring 48 urges the head carrier 18 towards the drum periphery, and the raised tapered segment 86 allows the roller 74 to advance the carrier arm 18 for closer contact between the head tip and tape 24.

Conversely, when the solenoid is de-energized during "Standby" operation, the bell crank 98 is inactivated and the extension springs 92 which are mounted circumferentially to the cup 90 pull the cup and the control rod 44 down towards the carrier arm. This action causes the tapered segment 86 of the control rod 44 to act on the roller 74 so as to urge the carrier arm 18 and magnetic head 54 away from the magnetic tape 24.

During operation, the adjustment knob 38 may be rotated to vary the vertical position of the knob, and therefore sets a limit for the position of the supporting cup 90 when the bell crank 98 is actuated. The knob 38 has a plurality of spaced slots on a flange 102 (shown in FIGURE 1) which sequentially engages a ball plunger 106 disposed in the cover 36 during rotation of the knob until the desired adjustment of head tip to tape has been achieved. The viewable surface of the knob 38 has an index so that the operator may determine the amount of adjustment that has been applied as the head 54 is advanced or retracted with respect to the tape 24. The index may have a zero or reference point from which adjustments can be made in either direction. In apparatus employing the invention, it was found that when utilizing 20 spaced slots around the flange 102 of the knob, one turn between two adjacent slots would provide .0005 inch of adjustment from head tip to tape.

With reference to FIGURES 1 and 6, the release cap 46 has three ears 108 spaced about 120° apart, and one of these ears 108 has a bayonet type pin 110 therein which snaps into a cooperating aperture located in the supporting cup 90 adjacent to the release cap 46. To assemble the control rod 44 for engagement with the carrier aperture 72, the release cap 46 is depressed against a spring retained between a retainer and the cup 90, and the cap 46 is rotated until the bayonet pin 110 snaps into the aperture in the cup. When it is desired to remove the control rod 44, the release cap 46 is depressed so that the bayonet pin 110 is disengaged from the aperture, and the cap 46 is rotated until the cap and the ears may be lifted away from the supporting cup 90. The assembly or release of the cap 46 in turn assembles or releases the control element 44 with relation to the carrier arm 18.

A contact switch may be utilized whereby when the release cap 46 is removed, the energizing circuit is opened thereby halting the drive of the drum 14 and the magnetic tape apparatus.

It is understood that the system described heretofore is presented for the purpose of illustration, and that the invention is generally applicable to any magnetic tape scanning system wherein a magnetic tape is transported adjacent to a rotating magnetic transducer assembly. Furthermore although an apparatus utilizing only one magnetic transducer assembly is described herein, the invention is also applicable to an apparatus employing a plurality of rotatable magnetic transducers for scanning a magnetic medium.

There has been described herein a magnetic tape apparatus which provides a magnetic transducer carrier assembly that may be adjusted during operation of the apparatus for proper head tip to tape contact by a convenient control means. Furthermore the transducer assembly may be easily and quickly removed for replacement with a new carrier and head.

An important feature of this invention is that during "Standby" operation, the carrier assembly and transducer are withdrawn from contact with the tape, although the scanning drum which supports the carrier and transducer may be rotating continuously adjacent to the tape. When the "Record or Reproduce" mode is introduced, the transducer automatically contacts the tape for recording or reproduction of signal information.

What is claimed is:

1. In a magnetic tape apparatus, a combination comprising: a rotatable member for rotating a magnetic transducer adjacent to a movable magnetic medium; a carrier for holding said transducer supported by said rotatable member; a transport means coupled with said carrier for moving said carrier radially with respect to said rotatable member and said magnetic medium during rotation of said member and movement of said medium; and a control means for controlling the radial position of said carrier and said transducer relative to said magnetic medium.

2. In a magnetic tape apparatus, a combination comprising: a rotatable member for rotating a magnetic transducer adjacent to a magnetic medium; a carrier for holding said transducer supported by said rotatable member; a transport means coupled with said carrier for moving said carrier with respect to said rotatable member and said magnetic medium; a control means for controlling the relative position of said carrier and said transducer relative to said magnetic medium; and a guiding means for said control means mounted perpendicular to and coaxially with said rotatable member.

3. A magnetic tape apparatus for transferring information between a magnetic medium and a magnetic transducer comprising: a rotatable member having a recessed section formed in one surface thereof, said recessed section extending radially from the periphery of said member; a carrier for securing said magnetic transducer for mounting within said recessed section so that said magnetic transducer projects from said carrier and from the periphery of said rotatable member; a transport means for moving said carrier radially along said recessed section; and a control element for engagement with said transport means to actuate said carrier in one direction when said control element is directed towards said carrier and to limit the movement of said carrier in a direction opposite to said one direction when said control element is directed away from said carrier.

4. A magnetic tape apparatus as in claim 3 wherein said control element is disposed substantially perpendicular to the plane of rotation of said rotatable member.

5. A magnetic tape apparatus as in claim 3 wherein said control element is disposed substantially perpendicular to said radial recessed section and said carrier.

6. A magnetic tape apparatus as claimed in claim 3 wherein said control element is coupled to a rotatable vernier calibration knob for fine adjustment of said element.

7. A magnetic tape apparatus such as claimed in claim 3 including a means for releasing said control element from engagement with said carrier so that said carrier may be removed from said recessed section.

8. A magnetic tape apparatus for scanning a magnetic tape with a magnetic transducer comprising: a pair of spaced cylinders for guiding said magnetic tape about a cylindrical axis; a rotatable drum disposed between said cylinders within said space, said drum and said cylinders being coaxially aligned; a carrier for carrying a magnetic transducer to be rotated adjacent to said magnetic tape supported by said drum; a drive means for rotating said drum with relation to said spaced cylinders; a control means for coacting with said carrier to move said carrier in a direction substantially normal to said cylindrical axis and along said recessed section of said drum; and means for releasing said control means so that said carrier may be disengaged from said apparatus.

9. In a magnetic tape apparatus, a combination for controlling the position of a magnetic transducer relative to a magnetic medium comprising: a carrier arm having a slot for carrying a magnetic transducer at one end; a support for said carrier arm; a control rod for controlling the movement of said carrier arm along said support; a transport part including an apertured portion coupled with said carrier arm for cooperating with said control rod; a roller mounted within said apertured portion for coaction with said control rod; and means for adjusting said control rod to vary the relationship between said rod and said roller so that said carrier arm may be moved along a linear path on said support.

10. A combination as claimed in claim 7 wherein said control rod has a tapered segment for coacting with said roller to vary the position of said carrier arm.

11. In a magnetic tape apparatus for transferring signal information between a movable magnetic medium and a magnetic transducer, the combination comprising: a rotatable drum having a recessed section in one surface of said drum; a hollow drum shaft coaxially mounted to said drum; a carrier for placement in said recessed section, said carrier having means for securing said magnetic transducer at one end such that said transducer projects from said carrier and from said drum when said carrier is mounted within said recessed section, said carrier having an apertured portion; a roller mounted within said apertured portion having a diameter greater than the depth of said aperture; a tapered control rod disposed within said drum shaft for controlling the movement of said roller and said carrier whereby the spacing between said transducer and said medium may be adjusted.

12. In a magnetic tape apparatus, an assembly for carrying a magnetic transducer comprising: an elongated carrier arm for supporting said transducer; roller means for transporting said carrier arm coupled to said arm; and a control means disposed perpendicularly to the longitudinal axis of said arm cooperating with said transporting means for actuating said transporting means to move said arm in one direction along said axis, and for limiting the movement of said arm in a direction opposite from said one direction.

13. In a magnetic tape apparatus, a magnetic transducer carrier assembly comprising: an elongated arm, said arm including means for carrying a projecting magnetic transducer at one end, said arm and transducer being rotatable relative to a movable magnetic medium; an apertured part spaced from said end; and a roller mounted in said apertured part, said roller having a diameter greater than the thickness of said apertured part.

14. In a magnetic tape apparatus, a carrier assembly for transporting a magnetic transducer during operation of said apparatus comprising: a rotatable elongated arm for carrying said transducer in a projecting relationship adjacent to a longitudinally moving magnetic medium; a transport part for moving said arm and said transducer along a predetermined grooved path; and a control means for actuating said transport part to move said carrier assembly along said path in one direction, and for limiting the movement of said carrier assembly in a direction opposite to said one direction.

References Cited in the file of this patent

UNITED STATES PATENTS

| | | |
|---|---|---|
| 2,648,589 | Hickman | Aug. 11, 1953 |
| 2,772,328 | Lyons | Nov. 27, 1956 |
| 2,905,933 | Canepa | Sept. 22, 1959 |
| 2,924,668 | Hoshino | Feb. 9, 1960 |